(12) United States Patent
Dwivedi

(10) Patent No.: US 11,317,640 B2
(45) Date of Patent: *May 3, 2022

(54) FRUIT SNACK WITH PROBIOTICS AND METHOD OF MANUFACTURING A FRUIT SNACK WITH PROBIOTICS

(71) Applicant: PROMOTION IN MOTION, INC, Allendale, NJ (US)

(72) Inventor: Basant K. Dwivedi, Randolph, NJ (US)

(73) Assignee: PROMOTION IN MOTION, INC, Allendale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/804,579

(22) Filed: Feb. 28, 2020

(65) Prior Publication Data

US 2020/0367526 A1 Nov. 26, 2020

Related U.S. Application Data

(63) Continuation of application No. 15/669,442, filed on Aug. 4, 2017, now Pat. No. 10,602,754, which is a continuation of application No. 12/256,101, filed on Oct. 22, 2008, now Pat. No. 9,750,267.

(60) Provisional application No. 60/982,190, filed on Oct. 24, 2007.

(51) Int. Cl.
*A23G 3/54* (2006.01)
*A23G 3/36* (2006.01)
*A23G 3/48* (2006.01)
*A23P 20/25* (2016.01)
*A23L 19/00* (2016.01)
*A23L 33/135* (2016.01)

(52) U.S. Cl.
CPC ............... *A23G 3/54* (2013.01); *A23G 3/366* (2013.01); *A23G 3/48* (2013.01); *A23L 19/09* (2016.08); *A23L 33/135* (2016.08); *A23P 20/25* (2016.08)

(58) Field of Classification Search
CPC .. A23G 3/54; A23G 3/366; A23G 3/48; A23L 19/09; A23L 33/135; A23P 20/25
USPC .......................................................... 426/61
See application file for complete search history.

(56) References Cited

U.S. PATENT DOCUMENTS

| | | | |
|---|---|---|---|
| 5,968,569 | A | 10/1999 | Cavadini et al. |
| 6,375,998 | B1 | 4/2002 | Wu |
| 6,528,102 | B1 | 3/2003 | Coyle et al. |
| 6,676,982 | B2 | 1/2004 | Mody |
| 6,723,358 | B1 | 4/2004 | van Lengerich |
| 6,827,957 | B2 | 12/2004 | Paluch et al. |
| 2004/0253347 | A1 | 12/2004 | Gaonkar et al. |

(Continued)

*Primary Examiner* — Hamid R Badr
(74) *Attorney, Agent, or Firm* — Cowan, Liebowitz & Latman, P.C.

(57) ABSTRACT

A fruit snack with probiotics that is stable at room temperature is manufactured by combining various ingredients including fruit juices/purees to produce a slurry and cooking the slurry to produce a center that contains a high moisture content. The fruit snack center is covered with a barrier layer which in turn is covered by an outer layer that contains heat sensitive ingredients, such as probiotic cultures. The barrier layer substantially prevents migration of moisture from the center to the outer layer, and the fruit snack is cooled prior to applying the outer layer to minimize damage/harm to the heat sensitive ingredients. In addition to including probiotic cultures and being stable at room temperature, the fruit snack has other desirable characteristics including a chewy soft texture and fruit-flavorings, and may be manufactured using traditional processes.

20 Claims, 1 Drawing Sheet

(56) References Cited

U.S. PATENT DOCUMENTS

| | | |
|---|---|---|
| 2005/0095348 A1 | 5/2005 | McCabe |
| 2005/0191406 A1 | 9/2005 | Alexander et al. |
| 2006/0068019 A1 | 3/2006 | Dalziel et al. |
| 2006/0110493 A1 | 5/2006 | Schnieber et al. |
| 2006/0134285 A1 | 6/2006 | Schnieber et al. |
| 2007/0110844 A1 | 5/2007 | Kubantseva et al. |
| 2007/0148324 A1 | 6/2007 | Lin et al. |
| 2007/0160589 A1 | 7/2007 | Mattson |
| 2007/0231450 A1 | 10/2007 | Coleman et al. |
| 2008/0026108 A1 | 1/2008 | Subramanian et al. |
| 2008/0102163 A1 | 5/2008 | O'Toole |

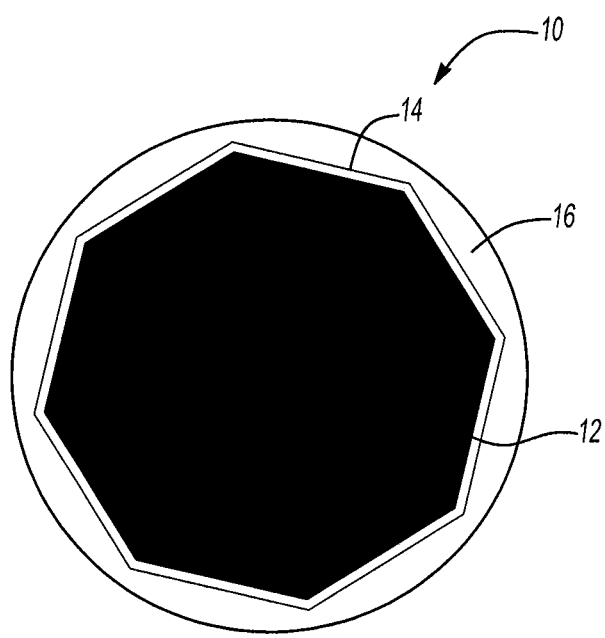

FRUIT SNACK WITH PROBIOTICS AND METHOD OF MANUFACTURING A FRUIT SNACK WITH PROBIOTICS

REFERENCE TO RELATED APPLICATIONS

This is a continuation of U.S. patent application Ser. No. 15/669,442, filed Aug. 4, 2017, now U.S. Pat. No. 10,602,754, and U.S. patent application Ser. No. 12/256,101, now U.S. Pat. No. 9,750,267, filed Oct. 22, 2008, which claims priority to Provisional Patent Application No. 60/982,190, filed Oct. 24, 2007, the disclosures of which are incorporated herein by reference.

FIELD OF THE INVENTION

The present invention pertains to a fruit snack with probiotics and method for manufacturing same and, more particularly, to a fruit snack product, and manufacturing method, that contains healthy live and active cultures (probiotics) that are stable at room temperature.

BACKGROUND OF THE INVENTION

Probiotics are defined as live microorganisms that beneficially affect the host upon ingestion by improving the balance of the intestinal microflora. The dietary use of live microorganisms has a long history. Mention of cultured dairy products is found in the Bible and the sacred books of Hinduism. Soured milks and cultured dairy products, such as kefir, koumiss, leben and dahi, were often used therapeutically before the existence of microorganisms was recognized. The use of microorganisms in food fermentation is one of the oldest methods for producing and preserving food. Much of the world depends upon various fermented foods that are staples in the diet.

Élie Metchnikoff, the father of modern immunology, spoke highly about the possible health benefits of the lactic acid-bacteria (LAB) *Lactobacillus bulgaricus* and *Streptococcus thermophilus* in his writings at the turn of the last century. He wrote in his book, The Prolongation of Life, that consumption of live bacteria, such as *Lactobacillus bulgaricus* and *Streptococcus thermophilus*, in the form of yogurt was beneficial for gastrointestinal health, as well as for health in general, and for longevity. Some recent research suggests that certain live microorganisms may have immunomodulatory and anticarcinogenic effects, as well as other health benefits. The gastrointestinal tract represents a complex ecosystem in which a delicate balance exists between the intestinal microflora and the host. The microflora are principally comprised of facultative anaerobes and obligate anaerobes. Approximately 95% of the intestinal bacterial population in humans is comprised of obligate anaerobes, including *Bifidobacterium, Clostridium, Eubacterium, Fusobacterium, Peptococcus, Peptostreptococcus* and *Bacteroides*. Approximately 1% to 10% of the intestinal population is comprised of facultative anaerobes, including *Lactobacillus, Escherichia coli, Klebsiella, Streptococcus, Staphylococcus* and *Bacillus*. Aerobic organisms are not present in the intestinal tract of healthy individuals with the exception of *Pseudomonas*, which is present in very small amounts. Most of the bacteria are present in the colon where the bacterial concentration ranges between $10^{11}$ and $10^{12}$ colony-forming units (CPU) per milliliter.

The intestinal microflora are important for maturation of the immune system, the development of normal intestinal morphology and in order to maintain chronic and immunologically balanced inflammatory response. The microflora reinforce the barrier function of the intestinal mucosa, helping in the prevention of the attachment of pathogenic microorganisms and the entry of allergens. Some members of the microflora may contribute to the body's requirements for certain vitamins, including biotin, pantothenic acid and vitamin B12. Alteration of the microbial flora of the intestine, such as may occur with antibiotic use, disease and aging, can negatively affect its beneficial role.

Currently available food products and supplements with probiotic cultures include fermented products such as yogurt, cultured butter milk, dahi, and dried cultures in a capsule form. Fermented products have a limited shelf life and require refrigeration. High moisture content of the products as well as temperatures exceeding refrigeration dramatically reduces the shelf life and viable probiotic bacterial count. As for products with low moisture content that may contain probiotic cultures, such as dry breakfast cereal, such products have very limited mass appeal. Examples of various food products, some of which contain probiotics, include those described in U.S. Pat. Nos. 5,968,569; 6,375,998; 6,723,358; 6,827,957; 6,528,102; and 6,676,982, and U.S. Patent Publication Nos. 2007/0110844; 2008/0102163; 2008/0026108; 2006/0110493; 2006/0134285; 2007/0148324; and 2007/0231450, each of which is incorporated herein by reference. As illustrated by the foregoing discussion, previously known and available products, have limited value in today's highly mobile and active life-style.

OBJECTS AND SUMMARY OF THE INVENTION

It is therefore an object of the present invention to provide a desirable food product, and method of manufacturing such a product, that contains probiotic cultures, and is stable at room temperature for an extended period of time, such as several months.

It is another object of the present invention to provide a food product with the foregoing mentioned characteristics that is highly palatable and enjoyed by the young and old alike.

It is a further object of the present invention to provide a formulation for a fruit based snack that contains probiotic cultures, is stable at room temperature for an extended period of time and that maintains all the desirable characteristics of such types of products including a chewy soft texture.

It is yet another object of the present invention to provide a fruit snack product with the foregoing characteristics and wherein the delicate flavors used as part of the formulation are not destroyed in whole or substantially in part during manufacturing thereof.

It is yet a further object of the present invention to provide a fruit snack product with a high moisture content with the foregoing characteristics.

It is yet an additional object of the present invention to provide a fruit snack product that can be produced by traditional manufacturing processes, such as starch molding or extrusion, without destroying the heat sensitive ingredients, including the probiotic cultures.

To achieve the foregoing and other objects, a process for manufacturing a food product, such as a fruit snack, is carried out by combining a plurality of ingredients to produce a slurry, cooking the slurry to produce a center for the food product, the center having a substantial moisture content, applying a barrier layer to the center of the food product, the barrier layer adapted to substantially prevent migration of moisture from the center of the food product, applying an outer layer over the barrier layer applied to the center of the food product, the outer layer containing probiotic cultures, and allowing the center of the food product to cool to substantially room temperature prior to applying the outer layer.

Also in accordance with the present invention, a food product (e.g., fruit snack) of the invention includes a center that has a substantial moisture content, a barrier layer disposed over the center, the barrier layer adapted to substantially prevent migration of moisture from the center of the food product, and an outer layer disposed over the barrier layer, the outer layer containing probiotic cultures.

Also in accordance with the present invention, a process of manufacturing a food product is carried out by providing a center for the food product, the center having a substantial moisture content, applying a barrier layer around the center of the food product, applying an outer layer around the barrier layer, the outer layer containing probiotic cultures, and the barrier layer is adapted to substantially prevent migration of a substantial amount of the moisture content from the center to the outer layer.

Also in accordance with the present invention, a process of manufacturing a food product is carried out by combining a plurality of ingredients to produce a slurry, cooking the slurry to produce a center for the food product, applying a barrier layer to the center of the food product, applying an outer layer over the barrier layer applied to the center of the food product, the outer layer containing heat sensitive components (e.g., probiotic cultures), and allowing the center of the food product to cool to substantially room temperature prior to applying the outer layer.

Also in accordance with the present invention, a food product has a center having a substantial moisture content, a barrier layer disposed over the center, the barrier layer adapted to substantially prevent migration of moisture from the center of the food product, and an outer layer disposed over the barrier layer, the outer layer containing heat sensitive components.

The above summarized processes and food products in accordance with the present invention may include additional aspects and features, as summarized below.

As one aspect of the invention, fruit puree and/or fruit juice are included with other ingredients to produce the slurry.

As a further aspect, the moisture content of the center of the food product is at least 10%.

As another aspect, sweetening agents, flavoring agents, water, acidulants, and fruit purees and/or juices are combined to produce the slurry.

As an additional aspect, the slurry is cooked to a temperature that exceeds 212° F.

As yet a further aspect, the barrier layer contains fruit flavors.

As yet another aspect, the barrier layer is a yogurt coating, and the yogurt contain may contain yogurt powder, milk powder, sugar, and/or fat.

As yet an additional aspect, the center of the food product is cooled to substantially room temperature prior to applying the barrier layer.

As still yet another aspect of the invention, an oil/fat based outer layer containing the probiotic cultures is applied over the barrier layer.

As still yet a further aspect, the outer layer contains vitamins.

As another aspect, the outer layer is a yogurt layer that contains dried probiotic cultures.

As a further aspect, the barrier layer is allowed to substantially dry before the outer layer is applied.

As an additional aspect, the outer layer is a yogurt coating containing probiotic cultures, and the outer layer is thicker than the barrier layer.

As yet a further aspect, the barrier layer contains fruit flavored (e.g., strawberry) powder.

As yet an additional aspect, the barrier layer is a slurry of zein protein, CMC gum, or xanthan gum. The barrier layer preferably is substantially dry before the outer layer is applied.

As yet another aspect, the barrier layer and the outer layer are both a milk chocolate coating, with the outer layer coating containing probiotic cultures or other heat sensitive ingredients.

As still yet a further aspect, the outer layer, which includes the probiotic cultures or other heat sensitive components, is yogurt, dark chocolate and/or milk chocolate.

As still yet another aspect, the barrier layer includes vegetable gums adapted to prevent migration of moisture from the center to the outer layer. The vegetable gums may be CMC, xanthan gum, gum Arabic, and/or carageenan gum.

As still yet an additional aspect, the barrier layer is a water soluble protein. The water soluble protein may be zein, egg albumin or milk-albumin.

As yet a further aspect, the barrier and outer layers represent by weight between 5% and 80% of the food product.

Various other objects, advantages and features of the present invention will become readily apparent to those of ordinary skill in the art from the following detailed description of the invention.

BRIEF DESCRIPTION OF THE DRAWING

The following detailed description, given by way of example and not intended to limit the present invention solely thereto, will best be appreciated in conjunction with the accompanying drawing, in which:

FIG. 1 is a schematic illustration of a fruit snack in accordance with the present invention.

DETAILED DESCRIPTION OF THE PRESENT INVENTION

As summarized above, the present invention is a fruit snack with probiotics (or, for convenience, "fruit snack" or "food product") that is stable at room temperature for an extended period of time (i.e., at least several months) and a method of manufacturing such a fruit snack. As would be appreciated, the fruit snack of the present invention makes it convenient for consumers to get the benefit of probiotics in a food product that can be eaten at any time of the day without worrying about stability or spoilage. Moreover, fruit snacks, that is, products that contain fruit, are particularly well accepted among the general public, particularly children, teenagers, and young adults.

The fruit snack of the present invention is manufactured in multiple steps, as herein described. With reference to FIG. 1, which is a simplified schematic illustration of a fruit snack 10 in accordance with the present invention, the center 12 of the fruit snack initially is made by combining in the form of a slurry a variety of ingredients, including sweetening agents, flavoring agents, binders, water, stabilizers, acidulants, fruit purees and juices, and coloring agents. The slurry is cooked to produce the fruit snack center 12. The center should have a residual moisture level of between 10% and 25%. If necessary, a vacuum chamber or other acceptable device may be used to reduce the residual moisture of the fruit snack center to the desired level.

The particular ingredients of the fruit snack center may be varied, as well as its manner of cooking. For example, the fruit snack center may be manufactured in the same or similar manner as now known fruit snack centers are manufactured. Various examples of ingredients as well as various manners of cooking are provided below.

After the fruit snack center 12 is cooked, it is cooled down, preferably to room temperature. In accordance with the present invention, a barrier film/layer 14 is applied to the cooled-down center 12. The barrier film/layer 14 (also referred to herein as "barrier layer") functions to substantially prevent moisture migration from the center to the outer layer, which as described further below contains probiotic cultures. As set forth in the various Examples discussed below, the barrier layer may be commercial yogurt coating, zein protein, CMC gum, xanthan gum, dark chocolate and milk chocolate. The barrier layer may be made of other suitable materials.

The barrier firm/layer also preferably contains fruit flavors in either an oil soluble or in dry form. The barrier film/layer is applied to the center in a coating pan or belt coater, or in another suitable manner.

After the barrier film/layer is completely set, an oil/fat based nutritional layer 16 (sometimes referred to herein as the "outer layer") is applied to the fruit snack center containing the barrier layer. In accordance with the present invention, the outer layer 16 contains probiotic cultures (the terms "probiotic cultures" and "probiotics" are used interchangeably herein). Dried probiotic cultures are well suitable to be employed in the present invention. Since probiotic cultures are sensitive to heat, the fruit snack center with the barrier layer is cooled further, preferably to room temperature, if not already sufficiently cool to prevent the destruction of a meaningful amount of the probiotic cultures upon application. Ideally, no probiotic cultures or only a small amount of the cultures are destroyed upon applying the outer layer. The outer layer preferably also contains vitamins.

After substantial testing, it has been found that the formulation of the present invention has excellent taste characteristics while providing the benefit of probiotic cultures.

Typical formulations for a fruit snack, some in accordance with the present invention (Examples 5 through 12) and some not in accordance with the present invention (Examples 1 through 4), were created in the following described manners.

Example 1

| INGREDIENT | PERCENTAGE |
| --- | --- |
| Corn syrup | 20.50 |
| Fruit Juice | 45.00 |
| Strawberry Puree | 10.00 |
| Cornstarch | 6.67 |
| Sugar | 16.65 |
| Citric acid | 0.74 |
| Flavor | 0.13 |
| Color | 0.01 |
| Vitamins A, C and E mix | 0.2 |
| Probiotic culture powder (L. acidophilus, L. Casei) | 0.1 (50 billion cells/g) |

A uniform slurry of the ingredients set forth in the table of Example 1 above was made in a kettle provided with a suitable agitator. The slurry was cooked to a temperature of 240° F. until the moisture amount was reduced to 22 percent. The cooked slurry was transferred to a starch molding machine and deposited in cavities of about 2 cc volume. After the product cooled to room temperature, it was tested for flavor quality and viable probiotic bacteria. The product was discarded because it did not contain any viable probiotic bacteria and lacked flavor. Most of the vitamins also were destroyed.

Example 2

| INGREDIENT | PERCENTAGE |
| --- | --- |
| Corn syrup | 20.50 |
| Fruit Juice | 45.00 |
| Strawberry Puree | 10.00 |
| Cornstarch | 6.67 |
| Sugar | 16.65 |
| Citric acid | 0.74 |
| Flavor | 0.13 |
| Color | 0.01 |
| Vitamins A, C and E mix | 0.2 |
| Probiotic culture powder (L. acidophilus, L. Casei) | 0.1 (50 billion cells/g) |

A slurry of the ingredients set forth in the table of Example 2 above, but excluding vitamin mix, acid, flavor and probiotic culture powder, was made and processed in the manner described in Example 1. After a moisture level of 22% was reached, remaining ingredients were added and the batch was process as described in Example 1. After the product cooled to room temperature, it was assayed for vitamin content, and viability of probiotic bacteria. No viable probiotic bacteria was detected in the product, and between 7 to 16 percent of the vitamins were also destroyed. Flavor of the product was judged inadequate. The batch was discarded.

Example 3

| INGREDIENT | PERCENTAGE |
| --- | --- |
| Corn syrup | 33.00 |
| Fruit Juice Conc. | 8.00 |
| Strawberry Puree | 3.50 |
| Cornstarch | 8.50 |
| Sugar | 29.00 |
| Water | 16.82 |
| Citric acid | 0.74 |
| Vitamin A, C and E mix | 0.20 |
| Flavor | 0.13 |
| Color | 0.01 |
| Probiotic culture powder (L. acidophilus, L. Casei) | 0.1 (50 billion cells/g) |

A uniform slurry of the ingredients set forth in the table of Example 3 above, with the exception of vitamin mix, acid, flavor and probiotic culture powder, was made in a kettle provided with a suitable agitator. The slurry was cooked in a continuous cooker at a temperature of 245° F. The cooked candy mass was transferred from the continuous cooker to a vacuum chamber to reduce the residual moisture to 22% and to cool the product to 190° F. Vitamin mix, acid, flavor and probiotic culture powder were added to the cooked mass and deposited in starch molds as in Example 1. After overnight curing at 60° F., the product was removed from the starch mold-boards and assayed for vitamin content and viability of probiotic bacteria. It was determined that while product flavor was satisfactory, 6 to 12% of the vitamins were destroyed along with most the probiotic bacteria. The batch was discarded.

Example 4

| INGREDIENT | PERCENTAGE |
| --- | --- |
| High fructose Corn Syrup | 71.06 |
| Fruit Juice Conc. | 4.50 |
| Strawberry Puree | 3.00 |
| Cornstarch | 20.00 |
| Citric Acid | 1.00 |
| Vitamin A, C and E mix | 0.20 |
| Flavor | 0.13 |
| Color | 0.01 |
| Probiotic culture powder (L. acidophilus, L. Casei) | 0.1 (50 billion cells/g) |

A uniform slurry of ingredients set forth in the table of Example 4 above, excluding vitamin mix, acid, flavor and probiotic culture powder, was made in the manner described in Example 3. The slurry was then cooked in a continuous cooker at a temperature of 240° F. A slurry of vitamin mix, acid, flavor and probiotic culture powder were continuously injected in the mass and then extruded in the form of thin cylindrical ropes. These ropes were then transferred to a cooling belt and cut to about 0.6 cm length and 1.1 g weight. The finished product was assayed for vitamin content, overall flavor and viability of probiotic bacteria. Like example 3, a significant portion of vitamins were destroyed along with most of the probiotic bacteria were destroyed. Flavor of the product was judged to be adequate. The batch was discarded.

Example 5

| INGREDIENT | PERCENTAGE |
| --- | --- |
| Corn syrup | 33.00 |
| Fruit Juice Conc. | 8.00 |
| Strawberry Puree | 3.50 |
| Cornstarch | 8.50 |
| Sugar | 29.00 |
| Water | 16.82 |
| Citric acid | 0.74 |
| Vitamin A, C and E mix | 0.20 |
| Flavor | 0.13 |
| Color | 0.01 |

The batch formulation without probiotic cultures was processed as in Example 3. After curing, pieces were removed from starch, cleaned and then thinly coated (sealed) with commercial yogurt coating containing yogurt powder, milk powder, sugar, fat and flavorings (the barrier layer). Once completely set/dried, a thicker layer (outer layer) of yogurt coating containing freeze-dried probiotic culture was applied. The finished product was assayed for viable probiotic bacteria. Over 97% of the bacteria were viable. Upon storage for one month, over 92% of the probiotic bacteria were viable. The finished product had an excellent taste and acceptable flavor profile as well.

Example 6

A batch was processed as in Example 5, but in Example 6, the thin coating (barrier layer) also included 1.0% powdered strawberry flavor. The remainder of the process was the same as in Example 5. The final product had an excellent flavor profile and retained probiotic bacteria as in example 5.

Example 7

A batch was processed as in Example 6 with the exception that the thin coating (barrier layer) consisted of a slurry of zein protein. The final profile of the product was similar to the product produced in Example 6.

Example 8

A batch was processed as in Example 6 with the exception that the thin coating (barrier layer) consisted of a slurry of CMC gum. The final profile of the product was similar to the product produced in Example 6.

Example 9

A batch was processed as in Example 6 with the exception that the thin coating (barrier layer) consisted of a slurry of xanthan gum. The final profile of the product was similar to the product produced in Example 6.

Example 10

| INGREDIENT | PERCENTAGE |
| --- | --- |
| High fructose Corn Syrup | 71.06 |
| Fruit Juice Conc. | 4.50 |
| Strawberry Puree | 3.00 |
| Cornstarch | 20.00 |
| Citric Acid | 1.00 |
| Vitamin A, C and E mix | 0.20 |
| Flavor | 0.13 |
| Color | 0.01 |

The batch without probiotic cultures was processed as in Example 4. The chewy fruit pieces produced were coated (sealed) with thin yogurt coating containing 1.0% powdered strawberry flavor at about 100° F. The final product had an excellent eating quality and retained essentially all of the probiotic bacteria.

Example 11

A batch was processed as in Example 5 with the exception that now the sealing coat (barrier layer) and the final thicker coat (outer layer) were made of milk chocolate as a replacement for the yogurt coating.

Example 12

A batch was processed as in Example 10 with the exception that the sealing coat (barrier layer) and the final thicker coat (outer layer) were made of milk chocolate as a replacement for the yogurt coating.

As described herein, the fruit snack of the present invention includes all of the desirable traits of fruit snacks including a chewy soft texture, delicate flavors and fresh fruit taste, with the added significant benefit of containing healthy live and active cultures. The manufacturing process of the present invention overcomes the problem of how to manufacture a suitable fruit snack without destroying the probiotic cultures. Moreover, the fruit snack of the present invention may be manufactured by employing traditional manufacturing processes, such as starch molding or extrusion, as herein described. Finally, the herein-described formulation provides a fruit based product that maintains an excellent eating quality, has an extended shelf life, and that maintains all the usual favorable characteristics that exist within such types of snack products, with the added benefit of containing beneficial probiotic cultures.

Having described the present invention including various features and variations thereof, it is intended that the appended claims be interpreted as including the embodiments described herein, the alternatives mentioned above, and all equivalents thereto.

What is claimed is:

1. A process of manufacturing a food product, comprising the steps of:
    combining a plurality of ingredients to produce a slurry;
    cooking the slurry to produce a center for the food product;
    applying a barrier layer to the center of the food product;
    allowing the center of the food product to cool; and
    applying an outer layer over the barrier layer applied to the center of the food product.

2. The process of claim 1, wherein the applied barrier and outer layers represent by weight between 5% and 80% of the food product.

3. The process of claim 1, wherein the step of applying an outer layer comprises applying an outer layer of at least one of yogurt, dark chocolate and milk chocolate, the outer layer including the heat sensitive components.

4. The process of claim 1, wherein the barrier layer includes vegetable gums adapted to prevent migration of moisture from the center to the outer layer.

5. The process of claim 4, wherein the vegetable gums are selected from a group consisting of CMC, xanthan gum, gum Arabic, and carageenan gum.

6. The process of claim 1, wherein the barrier layer is a water soluble protein.

7. The process of claim 6, wherein the water soluble protein is selected from a group consisting of zein, egg albumin and milk-albumin.

8. The process of claim 1, wherein the step of combining comprises combining at least one of fruit puree and fruit juice with another ingredient to produce the slurry.

9. The process of claim 1, wherein the step of combining comprises combining sweetening agents, flavoring agents, water, acidulants, and at least one of fruit purees and juices.

10. The process of claim 1, wherein the step of allowing the center of the food product to cool comprises cooling the center of the food product to substantially room temperature.

11. The process of claim 1, wherein the step of applying a barrier layer comprises applying a barrier layer of yogurt coating.

12. The process of claim 1, wherein the step of allowing the center of the food product to cool to is carried out prior to the step of applying the barrier layer to the center of the food product.

13. The process of claim 1, wherein the step of cooking comprises cooking the slurry to a temperature of at least 212° F.

14. The process of claim 1, wherein the outer layer comprises freeze-dried probiotic culture.

15. The process of claim 14, wherein the freeze-dried probiotic culture is at least 97% viable.

16. The process of claim 14, wherein the freeze-dried probiotic culture is at least 92% viable after one month of storage.

17. The process of claim 14, wherein the freeze-dried probiotic culture comprises about 50 billion cells per gram.

18. The process of claim 14, wherein the outer layer is about 100° F. when applied over the barrier layer.

19. The process of claim 14, wherein the outer layer comprises vitamins.

20. The process of claim 19, wherein the vitamins are selected from the group consisting of A, C and E.

* * * * *